Figure 1:
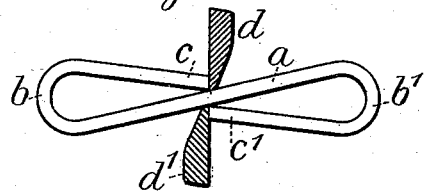

(No Model.)

J. T. PEDERSEN & A. B. YOUNG.
SCISSORS SHARPENER.

No. 537,306.   Patented Apr. 9, 1895.

Witnesses:
J Staib
Chas H Smith

Inventors:
Johannes T. Pedersen
Albert B Young
per
Lemuel W. Serrell
Atty

UNITED STATES PATENT OFFICE.

JOHANNES TH. PEDERSEN, OF NEW YORK, AND ALBERT B. YOUNG, OF BUFFALO, ASSIGNORS TO THEMSELVES, AND G. HERBERT CHENEY, OF BROOKLYN, NEW YORK.

SCISSORS-SHARPENER.

SPECIFICATION forming part of Letters Patent No. 537,306, dated April 9, 1895.

Application filed March 13, 1894. Serial No. 503,434. (No model.)

*To all whom it may concern:*

Be it known that we, JOHANNES THEODOR PEDERSEN, of the city and county of New York, and ALBERT B. YOUNG, of Buffalo, in the county of Erie and State of New York, citizens of the United States, have invented a new and useful Improvement in Scissors-Sharpeners, of which the following is a specification.

Our invention relates to the class of articles upon which both blades of a pair of scissors are sharpened at the same time, and the object of our invention is to provide a simple, neat and inexpensive article that can be used by any one for quickly sharpening the blades of a pair of scissors.

In carrying out our invention we prefer to employ round, hardened steel wire, the same being bent into approximately the form of a flattened letter S wherein the respective ends of the wire come at each side of the center member, the faces of the respective ends of the wire and the adjacent surfaces of the center member forming acute angles. The flat faces of the scissors blades bear against the respective end faces of the wire, while the edges of the scissors bear against the opposite surfaces of the center member or wire, and in sharpening the scissors blades the scissors are held in the hand and pressed against the wire and drawn back and forth in sharpening. In this operation the flat faces of the blades are not worn away but are simply kept true while the edges of the blades, bearing against the surfaces of the wire, are rubbed down or polished so that the cutting edge is restored.

We prefer to employ a guard formed of a separate piece connected to the sharpener or of the wire composing the sharpener bent to form. In holding the sharpener the guard is on the off side and the sharpener cannot be used if the guard is on the near side. Hence the correct holding position of the sharpener is insured. We also prefer that the respective end faces should not come directly over the center member, but a little at each side, as this insures a slight separation of the surfaces that act on the end faces and edges of the scissors and produces a clearance which is preferable to having the parts in exact alignment as thereby the burrs worked upon the edges of the scissors blades are more effectually removed because then the edges pass centrally across the end faces instead of at the edges thereof which is the case when the parts are in exact alignment.

Other material than wire may be employed to form the sharpener, so long as the same conditions as herein expressed are maintained.

Figure 2:
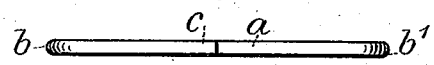
Figure 3:
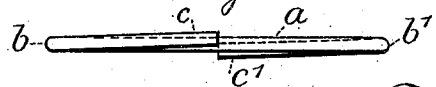
Figure 6:
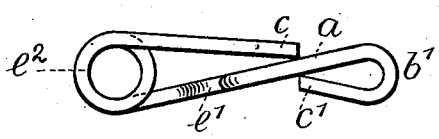
Figure 7:
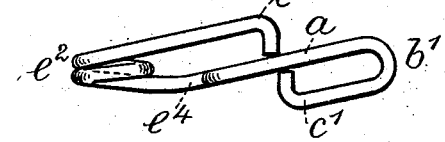
Figure 8:
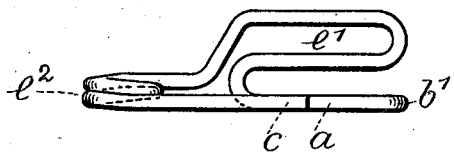
Figure 9:
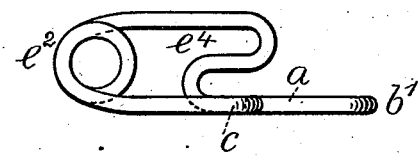
Figure 4:
Figure 5:
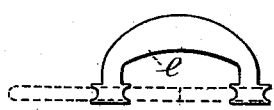

In the drawings, Figure 1 is an elevation illustrating our improvement with the scissors in section and in position for sharpening. Fig. 2 is an edge view of the same, and Fig. 3 is also an edge view showing the respective ends out of alignment with the center member of the same. Fig. 4 is an elevation showing a guard in position. Fig. 5 is a plan of the guard. Figs. 6 and 7 are elevations, and Figs. 8 and 9 are plan views representing slight modifications.

The wire that we prefer to employ in making our improved sharpener is what is known as glass hardened steel, and in the drawings the flattened S form represented has a center member $a$, rounded portions $b\ b'$ and ends $c\ c'$, and for convenience and cheapness in making we prefer to use wire of the same diameter throughout, and it is thus shown. The faces of the respective ends $c\ c'$ are in the same plane and in line with each other, and these faces form acute angles with the adjacent longitudinal surfaces of the center member $a$ at each side thereof.

$d\ d'$ represent the scissors blades, the flat faces of which, as shown in the drawings, bear against the faces of the ends $c\ c'$ which faces are in the same plane, the acute angle mentioned being greater or less as desired according to the angle of the edge of the scissors to the flat faces of the blades, but in all cases the said end faces must be in line with each other in the same plane.

In sharpening the scissors the flat faces of the blades bear against the faces of the respective ends $c\ c'$ of the wire, and the inclined edges are pressed down tightly against the opposite faces of the center member $a$ into the acute angles, and as held in the hand the scissors blades are drawn back and forth longitudinally over and at right angles to the center member, and the blades are opened and shut more or less in thus drawing them over the sharpener. The edges of the scissors against the center member are in this operation rubbed down or polished true and the edges are worked toward the faces of the ends $c\ c'$, and said faces keep said edges of the blades true and polished so that no burrs are worked up. The cutting edges of the scissors are thus restored and improved.

Supposing the scissors as usual to be held in the right hand, the sharpener can only be held correctly in one position in relation to the scissors. To insure this we prefer to provide a guard secured to or formed with the sharpener and which shall be on the off side of the sharpener when correctly held. Figs. 4 and 5 show by edge and plan views a guard $e$ made of sheet metal. This guard is held in place by the respective ends being passed in between the members $a$ and $c\ c'$ and turned over vertically.

In Figs. 6 and 8, the wire itself is bent to form the guard and so as to provide a more firm and convenient construction to be grasped in the fingers together with the guard $e'$, the flattened letter S form of the center and end members being preserved, but the wire is bent to form a guard $e'$ and an eye $e^2$ to be grasped by the fingers. In Figs. 7 and 9, the wire is also bent into an eye $e^3$ to be grasped by the fingers and a guard $e^4$ and the respective end portions instead of exposing end faces have surfaces in the same plane, which, with the opposite faces of the center member, form similar acute angles, the ends of the wire being bent down to the center member, but the operation of holding and sharpening the scissors blades is the same as in the modifications Figs. 6 and 8 and in the simple form shown in Figs. 1 and 2.

In Fig. 3 the ends $c\ c'$ are not directly over the center member but are shown as slightly diverging from or at each side of the line of the center member $a$, the object of which is to insure a slight separation of the surfaces and produce a clearance between the respective points of operative contact, namely, the opposite sides of the member $a$ and the end faces of $c\ c'$ that act on the faces and edges of the scissors, instead of having the parts in direct alignment where the blades come into contact with the sharpener.

It is obvious that the sharpener may be made of other materials than wire, so long as said materials are hard enough to effect the purpose and the same acute angles are maintained.

We claim as our invention—

1. As a new article of manufacture, a scissors sharpener formed from a continuous piece of metal bent so as to provide a center member and adjacent end members upon each side of the center member with acute angles to receive the scissors blades, substantially as set forth.

2. As a new article of manufacture, a scissors sharpener of a continuous piece of wire bent in the form of a flattened S and having a center member $a$ and end members $c\ c'$, the faces of the ends $c\ c'$ being in the same plane upon opposite sides of the center member and forming with the surfaces of the center member acute angles to receive the scissors blades, substantially as set forth.

3. As a new article of manufacture, a scissors sharpener formed from a continuous piece of metal bent so as to provide a center member and adjacent end members upon each side of the center member with acute angles to receive the scissors blades, and a guard to insure the proper holding position of the sharpener, substantially as set forth.

Signed by us this 8th day of March, A. D. 1894.

JOHANNES TH. PEDERSEN.
ALBERT B. YOUNG.

Witnesses:
GEO. T. PINCKNEY,
HAROLD SERRELL.